United States Patent [19]

Inata et al.

[11] 4,416,839
[45] Nov. 22, 1983

[54] WHOLLY AROMATIC POLYESTER COMPOSITION, PROCESS FOR PRODUCTION THEREOF, AND PRODUCTION THEREFROM OF A FILM-LIKE OR FIBROUS ARTICLE OF A WHOLLY AROMATIC POLYESTER

[75] Inventors: Hiroo Inata; Shunichi Matsumura, both of Iwakuni, Japan

[73] Assignee: Teijin Limited, Osaka, Japan

[21] Appl. No.: 399,009

[22] Filed: Jul. 16, 1982

[30] Foreign Application Priority Data

Jul. 20, 1981 [JP] Japan .................................. 56-112256
Aug. 10, 1981 [JP] Japan .................................. 56-124172
Feb. 22, 1982 [JP] Japan .................................. 57-26063

[51] Int. Cl.$^3$ ............................................. B29D 27/04
[52] U.S. Cl. .................................. 264/49; 264/209.1; 264/344; 264/561; 521/64; 521/182
[58] Field of Search ...................... 264/49, 209.1, 344, 264/561; 521/64

[56] References Cited

U.S. PATENT DOCUMENTS 3,957,651  5/1976  Kesting .................................. 521/64

*Primary Examiner*—Morton Foelak
*Attorney, Agent, or Firm*—Sherman & Shalloway

[57] ABSTRACT

A wholly aromatic polyester composition comprising (a) 100 parts by weight of a wholly aromatic polyester containing as a main component at least one compound selected from the group consisting of aromatic dicarboxylic acids, aromatic dihydroxy compounds and aromatic hydroxycarboxylic acids, and (b) from 5 to 300 parts by weight of a low-molecular-weight compound being substantially non-reactive with the wholly aromatic polyester and having a boiling point of at least about 200° C. under atmospheric pressure and a molecular weight of not more than 1,000.

The wholly aromatic polyester composition is produced advantageously by polycondensing in the molten state the polyester-forming starting mixture in the presence of the low-molecular-weight compound.

A film-like or fibrous article of a wholly aromatic polyester may be produced by extracting the low-molecular-weight compound from a film-like or fibrous article of the wholly aromatic polyester composition.

11 Claims, No Drawings

WHOLLY AROMATIC POLYESTER COMPOSITION, PROCESS FOR PRODUCTION THEREOF, AND PRODUCTION THEREFROM OF A FILM-LIKE OR FIBROUS ARTICLE OF A WHOLLY AROMATIC POLYESTER

This invention relates to a wholly aromatic polyester composition, a process for its production, and the production from it of a film-like or fibrous article of a wholly aromatic polyester.

More specifically, this invention pertains to a wholly aromatic polyester composition comprising a wholly aromatic polyester and a melt viscosity-reducing agent; a process for producing the wholly aromatic polyester composition by polycondensing materials for production of wholly aromatic polyester in the presence of the melt viscosity-reducing agent; and a process for producing a film-like or fibrous article of wholly aromatic polyester which comprises melt-molding the wholly aromatic polyester composition, and then stretching or extracting the film-like or fibrous article.

Various uses have been studied and proposed in the past for wholly aromatic polyesters derived, for example, from aromatic dicarboxylic acids and aromatic dihydroxy compounds because they have excellent thermal stability and mechanical properties. Generally, wholly aromatic polyesters have a high melt viscosity, and require much higher molding temperatures than such polyesters as polyethylene terephthalate. Methods have therefore been investigated for reducing the high melt viscosity or high molding temperature of wholly aromatic polyesters and thus improving their moldability. They include, for example, the mixing of various other polymers such as polyethylene (Japanese Laid-Open Patent Publication No. 51948/1973), polycarbonate (Japanese Laid-Open Patent Publication No. 54158/1973), and polyethylene terephthalate (Japanese Laid-Open Patent Publication No. 54158/1973). These mixed polymers, however, usually remain in the final molded articles, and such methods give rise to the new problem that the remaining polymers impair the inherent excellent properties, such as thermal stability, chemical resistance and mechanical properties, of wholly aromatic polyesters.

By melting characteristics, wholly aromatic polyesters can be roughly divided into those which form optically anisotropic melts and those which form optically isotropic melts. Since in the melt molding of a wholly aromatic polyester which forms an optically anisotropic melt the polymer molecular chains tend greatly to be oriented in the flowing direction of the melt, it is difficult to produce from such a polymer a molded article having a good balance between the flowing direction of the melt and a direction at right angles to it.

It was proposed to produce a film having properties well balanced between the machine and transverse directions from a wholly aromatic polyester which forms an optically anisotropic melt (European Patent Application Publication No. 0024499 and U.S. Pat. No. 4,333,907). The basic feature of this method is that immediately after the melt is extruded, the extrudate is stretched to more than 1.5 times both in the extruding direction and a direction at right angles to it. In order to produce a film having excellent uniformity, however, strictly controlled conditions must be maintained.

It is an object of this invention to provide a novel wholly aromatic polyester composition.

Another object of this invention is to provide a novel wholly aromatic polyester composition which is suitable for the production of molded articles such as films or fibers.

Still another object of this invention is to provide a wholly aromatic polyester composition having excellent moldability and a melt viscosity in the molten state which is lower than that of the wholly aromatic polyester and is suitable for melt molding.

Still another object of this invention is to provide a wholly aromatic polyester composition having excellent moldability, which can be melt-molded at much lower temperatures than that at which the wholly aromatic polyester itself can be molded.

Still another object of this invention is to provide a wholly aromatic polyester composition containing as a melt viscosity-reducing agent or a melt-moldability improving agent a specified low-molecular-weight compound which is substantially non-reactive with the wholly aromatic polyester and can be easily removed from a molded article prepared from the composition.

Still another object of this invention is to provide a wholly aromatic polyester composition comprising a wholly aromatic polyester form an optically anisotropic melt and a melt viscosity-reducing agent, which can be molded into a thin article, such as a film, of an optically anisotropic wholly aromatic polyester having properties well balanced between the flowing direction of the melt and a direction at right angles to it.

Still another object of this invention is to provide a process for very easily producing the wholly aromatic polyester composition of the invention, which comprises polycondensing in the molten state raw materials for a wholly aromatic polyester in the presence of a non-reactive low-molecular-weight melt viscosity-reducing agent, whereby the melt polycondensation can be carried out at a much lower temperature, and until a polymer of a much higher molecular weight is obtained, than in the case of melt-polycondensing the aforesaid materials in the absence of the melt viscosity-reducing agent.

Still another object of this invention is to provide a process for producing a film-like or fibrous article of a wholly aromatic polyester from the wholly aromatic polyester composition of the invention, which comprises the steps of melt-molding the wholly aromatic polyester composition into a film-like or fibrous article, and removing the melt viscosity-reducing agent from the resulting film-like or fibrous article by extraction.

Still another object of this invention is to provide a process for producing a molded article of a wholly aromatic polyester, which comprises forming an optically isotropic melt of the wholly aromatic polyester composition in accordance with this invention comprising a wholly aromatic polyester forming an optically anisotropic melt and a melt viscosity-reducing agent, molding the melt into a film-like or fibrous article, and then removing the melt viscosity-reducing agent from the resulting article by extraction.

Further objects and advantages of this invention will become apparent from the following description.

The objects and advantages of this invention are achieved in accordance with this invention by a wholly aromatic polyester composition comprising 100 parts by weight of a wholly aromatic polyester containing as a main component at least one compound selected from the group consisting of aromatic dicarboxylic acids, aromatic dihydroxy compounds and aromatic hydroxycarboxylic acids, and 5 to 300 parts by weight of a low-molecular-weight compound being substantially non-reactive with the wholly aromatic polyester and having a boiling point of at least 200° C. under atmospheric pressure and a molecular weight of not more than 1,000.

According to this invention, the aforesaid wholly aromatic polyester composition can be produced by a process which comprises polycondensing in the molten state a polyester-forming starting mixture consisting mainly of at least one compound selected from the group consisting of aromatic dicarboxylic acids, aromatic dihydroxy compounds, aromatic hydroxycarboxylic acids and ester-forming derivatives of these compounds in the presence of a low-molecular-weight compound having a molecular weight of not more than 1,000 which is substantially non-reactive with the starting mixture and the wholly aromatic polyester formed and is difficult to evaporate at least under the polycondensation conditions, thereby converting the starting mixture to a wholly aromatic polyester having a high molecular weight.

The wholly aromatic polyester composition of this invention can of course be prepared also by melt-mixing the wholly aromatic polyester with the low-molecular-weight compound. The process of this invention, however, is advantageous over this mixing method in that the temperatures to be loaded on the wholly aromatic polyester and the low-molecular-weight compound can be greatly decreased.

This, firstly, brings about the advantage of inhibiting the thermal decomposition of wholly aromatic polyesters because wholly aromatic polyesters generally have a high melting point and are susceptible to decomposition at molding temperatures above their melting points. A second advantage is that wholly aromatic polyesters having a high molecular weight can be produced at lower polycondensation temperatures than by a usual polycondensation process in which polycondensation is carried out in the absence of the low-molecular-weight compound; wholly aromatic polyesters having a higher degree of polymerization can be produced at the same polycondensation temperature; and a special polycondensation reaction apparatus requiring heating at high temperatures, as in the practice of a usual polycondensation process, is not always necessary.

Since according to the process of this invention, the above low-molecular-weight compound can drastically reduce the melt viscosity of wholly aromatic polyesters, polycondensation can be performed more rapidly, and wholly aromatic polyesters having a higher molecular weight can be produced more rapidly, than in the case of performing polycondensation in the absence of the low-molecular-weight compound.

The polyester-forming materials used in the process of this invention include aromatic dicarboxylic acids, aromatic dihydroxy compounds, aromatic hydroxy-carboxylic acids and ester-forming derivatives of these compounds.

Examples of preferred aromatic dicarboxylic acids are terephthalic acid, isophthalic acid, naphthalenedicarboxylic acid, diphenyldicarboxylic acid, diphenylsulfone dicarboxylic acid, diphenoxyethane dicarboxylic acid, diphenyl ether dicarboxylic acid, methylterephthalic acid and methylisophthalic acid. Terephthalic and isophthalic acids are especially preferred.

Examples of the aromatic dihydroxy compounds include hydroquinone, resorcinol, chlorohydroquinone, bromohydroquinone, methylhydroquinone, ethylhydroquinone, t-butylhydroquinone, t-amylhydroquinone, t-heptylhydroquinone, (α-phenylethyl)hydroquinone, (2-phenylprop-2-yl) hydroquinone, phenylhydroquinone, benzylhydroquinone, methoxyhydroquinone, 4,4'-dihydroxydiphenyl, 4,4'-dihydroxydiphenyl ether, bis(4-hydroxyphenoxy)ethane, 2,2'-dimethyl-4,4'-dihydroxydiphenyl, 3,3'-dimethoxy-4,4'-dihydroxydiphenyl ether, bis(2-chloro-4-hydroxyphenoxy)ethane, 2,2-bis(4-hydroxyphenyl)propane and 1,1-bis(4-hydroxyphenyl)cyclohexane. Of these, 2,2-bis(4-hydroxyphenyl)propane, hydroquinone and substituted hydroquinones such as methylhydroquinone are preferred.

Examples of the aromatic hydroxycarboxylic acids include p-hydroxybenzoic acid, 4-hydroxydiphenyl-4'-carboxylic acid, 3-chloro-4-hydroxybenzoic acid, 3-methoxy-4-hydroxybenzoic acid, 3-ethoxy-4-hydroxybenzoic acid, 2-methyl-4-hydroxybenzoic acid, 3-methyl-4-hydroxybenzoic acid, 2-phenyl-4-hydroxybenzoic acid, 3-phenyl-4-hydroxybenzoic acid, 2-chloro-4-hydroxydiphenyl-4'-carboxylic acid, and 2-hydroxynaphthalene-6-carboxylic acid. Of these, p-hydroxybenzoic acid is preferred.

The ester-forming derivatives of the aromatic dicarboxylic acids may, for example, be lower alkyl esters or aryl esters, such as dimethyl, diethyl, diphenyl, ditolyl and dinaphthyl esters, of the above-exemplified aromatic dicarboxylic acids. Of these, the aryl esters, above all diphenyl esters, are preferred. Examples are diphenyl terephthalate and diphenyl isophthalate.

The ester-forming derivatives of the aromatic dihydroxy compounds may, for example, be lower fatty acid esters of the above-exemplified aromatic dihydroxy componds, such as the acetates or propionates. Examples include hydroquinone diacetate and hydroquinone dipropionate.

The ester-forming derivatives of the aromatic hydroxycarboxylic acids may, for example, be lower alkyl esters, aryl esters or lower fatty acid esters of the above-exemplified aromatic hydroxycarboxylic acids. The lower alkyl esters and aryl esters are esters formed at the carboxyl group of the aromatic hydroxycarboxylic acids, and the lower fatty acid esters are esters formed at the hydroxyl group of the aromatic hydroxycarboxylic acids. To cite some examples of the esters of p-hydroxybenzoic acid, there can be mentioned methyl p-hydroxybenzoate, ethyl p-hydroxybenzoate, phenyl p-hydroxybenzoate, tolyl p-hydroxybenzoate, p-acetoxybenzoic acid, and p-propionyloxybenzoic acid. Especially preferred ester-forming derivatives of the aromatic hydroxycarboxylic acids are aryl esters, above all phenyl esters such as phenyl p-hydroxybenzoate.

According to the process of this invention, the polyester-forming materials are used in such proportions that the carboxyl groups or the ester-forming derivatives thereof are substantially equal in chemical equivalent to the hydroxyl groups or the ester-forming derivatives thereof, as is well known in the art. When a polyester-forming material having an ester-forming derivative of the carboxyl group is used, there should be present another polyester-forming material having a free hydroxyl group in an amount substantially equivalent to the carboxylate group. Likewise, when a polyester-forming material having an ester-forming derivative of the hydroxyl group is used, there should be present another polyester-forming material having a free carboxyl group in an amount substantially equivalent to the hydroxyl ester.

The polyester-forming materials used in the process of this invention may further include ester-forming compounds other than the aforesaid aromatic compounds. Examples of such other compounds are aliphatic or alicyclic dicarboxylic acids such as adipic acid, sebacic acid and cyclohexanedicarboxylic acid, or their ester-forming derivatives such as their alkyl or aryl esters, which may replace up to 30 mole% of the aromatic dicarboxylic acids.

Examples of the other compounds which can replace up to 30 mole% of the aromatic dihydroxy compounds include aliphatic or alicyclic diols such as ethylene glycol, neopentyl glycol, hexamethylene glycol, tetramethylene glycol and cyclohexane dimethylol.

As other compounds which can replace up to 30 mole% of the aromatic hydroxycarboxylic acids, there can be cited hydroxycarboxylic acids having an aliphatic hydroxyl group, such as p-hydroxyethoxybenzoic acid and hydroxycaproic acid, and their ester-forming derivatives such as their aryl, alkyl and lower fatty acid esters.

The aforesaid other ester-forming compounds may be used singly or as a mixture of two or more. When two or more of them are used, the total amount of these should preferably not exceed 30 mole% of the entire aromatic compounds used as main components.

The melt viscosity-reducing agent used in the process of this invention is a low-molecular-weight compound with a molecular weight of not more than 1,000 which is substantially non-reactive with the polyester-forming materials and the wholly aromatic polyester and is difficult to distill off at least under the polycondensation conditions, and thus, has a boiling point under atmospheric pressure of, for example, at least 200° C. Preferred are those having a boiling point of at least about 250, especially at least about 300° C., or a molecular weight of not more than 800.

Examples of the low-molecular-weight compound used in this invention include imide compounds of formula (1)-a

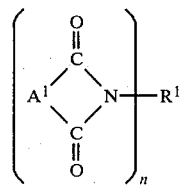

(1)-a wherein $A^1$ represents a divalent aromatic group which may be substituted; $R^1$ represents an aromatic group or linear or cyclic aliphatic group having a valence of n, each of which may be substituted; n is 1 or 2; and the imide ring is 5- or 6-membered, imide compounds of formula (1)-b

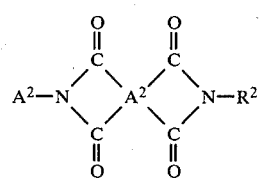

(1)-b wherein $A^2$ represents a tetravalent aromatic group which may be substituted; $R^2$ represents a monovalent linear or cyclic aliphatic group which may be substituted; and the imide rings are 5- or 6-membered, trialkyl isocyanurates of formula (1)-c

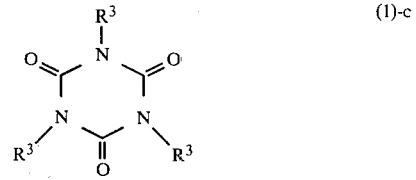

(1)-c wherein $R^3$ represents a monovalent alkyl group, and diphenyl compounds of formula (1)-d

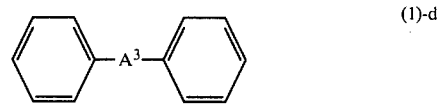

(1)-d wherein $A^3$ represents —O—, —SO$_2$—, —CO—, or an alkylene group, and the phenyl rings may be substituted.

The imide compounds of formula (1)-a and (1)-b, particularly the former, are preferred as the low-molecular-weight compound used in this invention.

In general formula (1)-a, examples of the divalent aromatic group for $A^1$ are 1,2-phenylene, 1,2-, 2,3- or 1,8-naphthylene, and 5,6,7,8-tetrahydro-1,2- or 2,3-naphthylene groups. These groups may be substituted by substituents which are non-reactive with the wholly aromatic polyesters. Examples of such substituents include lower alkyl groups such as methyl or ethyl, lower alkoxy groups such as methoxy and ethoxy, halogen atoms such as chlorine or bromine, and a cyclohexyl group which may be substituted by nitro, phenyl, phenoxy or methyl.

The aromatic group having a valence of n (n=1 or 2) which is represented by $R^1$ includes, for example, monovalent aromatic groups (n=1) such as a phenyl group, a naphthyl group, a 5,6,7,8-tetrahydro-1-, 2-, or 3-naphthyl group, or a group of the formula

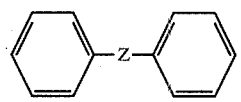

in which Z is —O—, —SO$_2$—, or —CH$_2$—, or divalent aromatic groups (n=2) such as a 1,2-phenylene group, a 1,2-, 2,3- or 1,8-naphthylene group, a 5,6,7,8-tetrahydro-1,2-, or 2,3-naphthylene group, or a groups of the formula

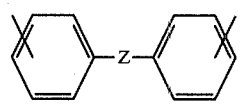

in which Z is —O—, —SO$_2$—, or —CH$_2$. Examples of the aliphatic group having a valence of n (n=1 or 2) include linear alkyl groups having 1 to 18 carbon atoms such as methyl, ethyl, butyl, hexyl, heptyl, octyl, nonyl, decyl, dodecyl, myristyl or stearyl, 5- or 6-membered cyclic alkyl groups such as cyclohexyl or cyclopentyl, linear alkylene groups having 2 to 12 carbon atoms such as ethylene, trimethylene, tetramethylene, hexamethylene, octamethylene, decamethylene or dodecamethylene, and a group of the formula

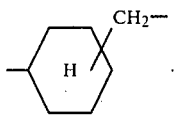

These groups represented by $R^1$ may have the same substituents as exemplified above with regard to $A^1$.

Preferred examples of the tetravalent aromatic group represented by $A^2$ in formula (1)-b are mononuclear, fused ring or polynuclear tetravalent aromatic groups represented, for example by the following formulae

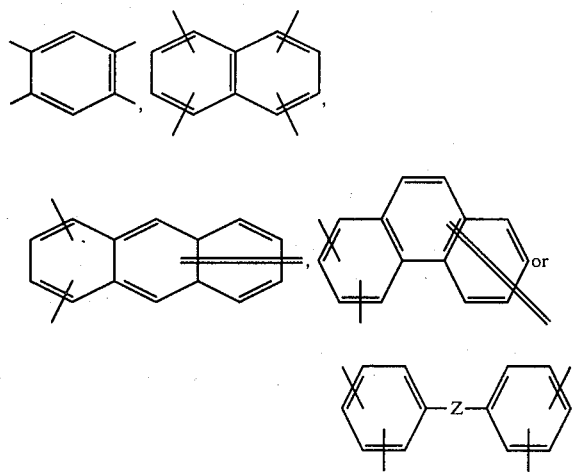

(Z is as defined above).

The same linear alkyl groups having 1 to 18 carbon atoms or 5- or 6-membered cyclic alkyl groups as exemplified with regard to $R^1$ in formula (1)-a may be cited as examples of the monovalent linear or cyclic aliphatic group for $R^2$.

The groups exemplified for $A^2$ and $R^2$ may be substituted by the same substituents as described above with regard to $A^1$.

Examples of the monovalent alkyl group for $R^3$ in formula (1)-c are linear alkyl groups having 1 to 10 carbon atoms, such as methyl, ethyl, propyl, butyl, hexyl, octyl and decyl.

Examples of the alkylene groups for $A^3$ in formula (1)-d include linear alkylene groups habing 2 to 4 carbon atoms, such as ethylene, trimethylene and tetramethylene. The phenyl group in formula (1)-d may be substituted by the same substituents exemplified hereinabove with regard to $A^1$.

Thus, examples of the imide compounds of formula (1)-a include those in which n is 1, such as N-methylphthalimide, N-ethylphthalimide, N-octylphthalimide, N-laurylphthalimide, N-myristylphthalimide, N-cetylphthalimide, N-stearylphthalimide, N-ethyl-1,8-naphthalimide, N-lauryl-1,8-naphthalimide, N-myristyl-1,8-naphthalimide, N-cetyl-1,8-naphthalimide, and N-stearyl-1,8-naphthalimide; and those in which n is 2, such as N,N'-ethylenebisphthalimide, N,N'-tetramethylene bisphthalimide, N,N'-hexamethylenebisphthalimide, N,N'-octamethylenebisphthalimide, N,N'-decamethylenebisphthalimide, N,N'-dodecamethylenebisphthalimide, N,N'-neopentylenebisphthalimide, N,N'-tetramethylenebis(1,8-naphthalimide), N,N'-hexamethylenebis-(1,8-naphthalimide), N,N'-octamethylenebis(1,8-naphthalimide), N,N'-decamethylenebis(1,8-naphthalimide), N,N'-dodecamethylenebis(1,8-naphthalimide), N,N'-1,4-cyclohexylenebisphthalimide, 1-phthalimide-3-phthalimidomethyl-3,5,5-trimethylcyclohexane, N,N'-2,4,4-trimethylhexamethylenebisphthalimide, N,N'-2,4,4-trimethylhexamethylenebisphthalimide, 4,4'-bisphthalimidodiphenylether, 3,4'-bisphthalimidodiphenylether, 3,3'-bisphthalimidodiphenylsulfone, 4,4'-bisphthalimidodiphenylsulfone, and 4,4'-bisphthalimidodiphenylmethane.

Examples of the imide compounds of formula (1)-b include N,N'-diethylpyromellitimide, N,N'-dibutylpyromellitimide, N,N'-dihexylpyromellitimide, N,N'-dioctylpyromellitimide, N,N'-didecylpyromellitimide, N,N'-dilaurylpyromellitimide, N,N'-dicyclohexylpyromellitimide, N,N'-bis(3,3,5-trimethylcyclophexyl)-pyromellitimide, and N,N'-diethyl-1,4,5,8-naphthalenetetracarboxylic acid 1,8- 4,5-diimide.

The imide compound of formula (1)-a can be produced by a known method from the corresponding acid anhydride and an organic amine.

Some of the imide compounds of formula (1)-a are known as dyeability improvers for modified polyesters (see Japanese Patent Publication No. 9677/1969), or a crystallization accelerator for polyethylene terephthalate injection-molding materials (see Japanese Laid-Open Patent Publication No. 84747/1981 and European Patent Application Publication No. 0029930).

Examples of the compounds of formula (1)-c are triethyl isocyanurate, tributyl isocyanurate, trihexyl isocyanurate and trioctyl isocyanurate.

Examples of the compounds of formula (1)-d are diphenyl ether, diphenylsulfone, benzophenone, diphenylmethane, 1,2-diphenylethane, 1,4-diphenylbutane, 4,4'-diphenoxydiphenylsulfone, 4,4'-bis(4-chlorophenoxy) diphenylsulfone, 4,4'-bis(3-chlorophenoxy)-diphenylsulfone, 4,4'-bis(2-chlorophenoxy)diphenylsulfone, 4,4'-bis(4-phenylphenoxy)diphenylsulfone, 4,4'-bis(3-phenylphenoxy) diphenylsulfone, 4,4'-bis(2-phenylphenoxy)diphenylsulfone, 4,4'-bis(4-t-butylphenoxy)diphenylsulfone, 4,4'-bis(3-t-butylphenoxy)-diphenylsulfone, 4,4'-bis(2-t-butylphenoxy) diphenylsulfone, 4,4'-bis(4-octylphenoxy)diphenylsulfone, 4,4'-bis(3-octylphenoxy)diphenylsulfone, 4,4'-bis(2-octylphenoxy)diphenylsulfone, 4,4'-bis($\alpha$-naphthyloxy) diphenylsulfone, and 4,4'-bis($\beta$-naphthyloxy)diphenylsulfone.

The process of this invention can be performed by polycondensing the polyester-forming materials described above in the molten state in the presence of the aforesaid low-molecular-weight compound.

Assuming that a wholly aromatic polyester of the same degree of polymerization is to be formed, the polycondensation temperature according to the process of this invention can be greatly reduced from that used in the case of polycondensing only the polyester-forming materials because the polycondensation is performed in the presence of the low-molecular-weight compound.

Except that the polycondensation temperature can be maintained at a much lower level as shown above, the operation of the polycondensation reaction itself can be carried out by methods known per se, for example those disclosed in U.S. patent application Ser. No. 311,329 and U.S. Pat. No. 4,333,907 and European Patent Application Publication Nos. 0024499 and 0049902. Accordingly, the specifications of these patent applications are incorporated herein by reference.

Generally, in a process for producing a wholly aromatic polyester by polycondensation in the molten state, the melting point of the mass in the reaction system tends to become gradually higher as the polycondensation proceeds, and it is often observed that at a stage where the degree of polymerization of the resulting wholly aromatic polyester is still not too high, the melting point of the mass in the reaction system exceeds 320°–330° C., or the melt viscosity of the mass is very high even if its melting point is below 330° C.

According to the process of this invention, it is possible generally to continue polycondensation in the molten state at a temperature of not more than about 330° C. until a wholly aromatic polyester having a fairly high degree of polymerization, for example a highly polymerized wholly aromatic polyester having a melt viscosity at 380° C. of at least 50,000 poises at a shear rate of 100 sec$^{-1}$, is formed.

Temperatures of 320° to 330° C. have a practical significance in that they are suited for materials constituting ordinary reaction vessels used to perform polyester-forming polycondensation, and that above these temperatures, heat decomposition of the resulting wholly aromatic polyester gradually increases.

The polycondensation reaction in accordance with this invention is carried out by methods known per se as stated hereinbelow.

Preferably used as the polyester-forming materials are a mixture consisting mainly of an aromatic dicarboxylic acid or its ester-forming derivative and an aromatic dihydroxy compound or its ester-forming derivative, preferably a mixture consisting mainly of an ester-forming derivative of an aromatic dicarboxylic acid and an aromatic dihydroxy compound; and a mixture consisting mainly of the above mixture and an aromatic hydroxycarboxylic acid or its ester-forming derivative, preferably a mixture consisting mainly of an aromatic dicarboxylic acid, an ester-forming derivative of an aromatic dihydroxy compound and an ester-forming derivative of an aromatic hydroxycarboxylic acid at the hydroxyl group, or a mixture consisting of an ester-forming derivative of an aromatic dicarboxylic acid, an aromatic dihydroxy compound and an ester-forming derivative of an aromatic hydroxycarboxylic acid at the carboxyl group.

Specific examples of the ester-forming derivatives in these polyester-forming materials are given hereinabove.

It will be readily appreciated that by using the aforesaid polyester-forming starting mixtures, there can be obtained a wholly aromatic polyester composition comprising an aromatic dicarboxylic acid and an aromatic dihydroxy compound as main components, and a wholly aromatic polyester composition comprising an aromatic dicarboxylic acid, an aromatic dihydroxy compound and an aromatic hydroxycarboxylic acid as main components.

The wholly aromatic polyester in the resulting wholly aromatic polyester composition can form either an optically isotropic melt or an optically anisotropic melt. For example, a wholly aromatic polyester containing p-hydroxybenzoic acid as one main component forms an optically anisotropic melt if the amount of the p-hydroxybenzoic acid is at least about 40 mole%. A wholly aromatic polyester composition not containing an aromatic hydroxycarboxylic acid as a main component may form an optically anisotropic melt depending upon the combination of the aromatic dicarboxylic acid and the aromatic dihydroxy compound. Such combinations are disclosed for example in U.S. Pat. No. 4,118,372 and Japanese Patent Publication No. 482/1980 which is incorporated herein by reference.

According to the process of this invention in which the polyester-forming materials are polycondensed in the molten state in the presence of the aforesaid low-molecular-weight compound, a composition containing a wholly aromatic polyester having an increased degree of polymerization can be produced at the same polycondensation temperature as compared with a conventional polycondensation process in which the polycondensation in the molten state is carried out in the absence of such a low-molecular-weight compound. The composition thus obtained by polycondensation in the molten state can, as required, be subjected to solid-phase polymerization in order to form a wholly aromatic polyester having a further increased degree of polymerization. The solid-phase polymerization can be carried out in the same way as known methods for producing wholly aromatic polyesters themselves by solid-phase polymerization. Specifically, the solid-polymerization can be carried out by heating a powder or granules of the wholly aromatic polyester composition at 200° C. to a temperature about 10° C. lower than the melting point of the wholly aromatic polyester composition, preferably about 230° to about 300° C., under reduced pressure to atmospheric pressure, preferably under reduced pressure of, for example, not more than 20 mmHg, in an atmosphere of, for example, nitrogen gas.

As stated hereinabove, the wholly aromatic polyester composition of this invention can also be produced by melt-mixing the wholly aromatic polyester with the low-molecular-weight compound. This wholly aromatic polyester can be produced by a polycondensation process known per se, for example the process described in U.S. Pat. No. 4,333,907. If the wholly aromatic polyester is to be produced by further performing solid-phase polymerization subsequent to melt-polymerization, the suitable solid-phase polymerization temperature to be employed is, for example, from 200° C. to a temperature about 10° C. lower than the melting point of the wholly aromatic polyester, preferably from about 230° C. to about 300° C.

Thus, according to this invention, there is provided an wholly aromatic polyester composition in accordance with this invention comprising 100 parts by weight of the wholly aromatic polyester and 5 to 300 parts by weight, preferably 10 to 200 parts by weight, of the low-molecular-weight compound being substantially nonreactive with the wholly aromatic polyester and having a boiling point at atmospheric pressure of at least about 200° C. and a molecular weight of not more than 1,000.

Furthermore, where the wholly aromatic polyester forms an optically anisotropic melt, the present invention provides a preferred wholly aromatic polyester composition comprising 100 parts by weight of the wholly aromatic polyester and 50 to 150 parts by weight of the low-molecular-weight compound. Likewise, where the wholly aromatic polyester is optically isotropic in the molten state, the present invention provides a preferred wholly aromatic polyester composition comprising 100 parts by weight of the wholly aromatic polyester and 10 to 50 parts by weight of the low-molecular-weight compound.

The wholly aromatic polyester composition provided by this invention can be converted, for example, to a film-like or fibrous article by a melt-shaping method.

Accordingly, the present invention further provides a process of producing a film-like or fibrous article of a wholly aromatic polyester, which comprises (1) shaping an unstretched film-like or fibrous article by melt-shaping from the aforesaid wholly aromatic polyester composition, and (2) either removing at least a major portion of the low-molecular-weight compound from the unstretched film-like or fibrous article by extraction with an organic solvent capable of dissolving the low-molecular-weight compound but substantially incapable of dissolving the wholly aromatic polyester under the extracting conditions; or stretching the unstretched film-like or fibrous article, and after, as desired, the stretched article is heat-set, removing at least a major portion of the low-molecular-weight compound from the stretched article by extraction with an organic solvent having the same properties as above.

The composition of this invention is provided by a melt-polycondensation process as a composition comprising a wholly aromatic polyester having a high degree of polymerization which cannot be obtained in the prior art by melt poly-condensation only. The composition of the invention, therefore, has the advantage that it can be molded at a lower temperature, or at the same temperature but with less loads, than the wholly aromatic polyester itself, assuming that the wholly aromatic polyesters have the same degree of polymerization.

Furthermore, since the composition of this invention contains the low-molecular-weight compound, even when the wholly aromatic polyester itself forms an optically anisotropic melt, the wholly aromatic polyester composition can form a melt which is optically isotropic. When an optically isotropic melt of the composition of this invention containing a wholly aromatic polyester capable of forming an optically anisotropic melt is melt-molded, there can, for example, be produced a substantially non-oriented unstretched film. This is advantageous in view of the fact that when an optically anisotropic wholly aromatic polyester melt is melt-molded, there can normally be produced only a monoaxially oriented unstretched film, for example. As will be described below in detail, this means that a substantially biaxially oriented stretched film can be produced from a wholly aromatic polyester capable of forming an optically anisotropic melt by using conventional stretching apparatuses. In addition to this advantage, it also means that a biaxially stretched film of wholly aromatic polyester having better properties than a biaxially stretched film obtained from a wholly aromatic polyester capable of giving an optically isotropic melt because a wholly aromatic polyester forming an optically anisotropic melt generally has more rigid molecular chains than the wholly aromatic polyester forming an optically isotropic melt.

According to the process of this invention, an unstretched film-like or fibrous article is formed by melt-molding the wholly aromatic polyester composition of this invention.

Melt-molding can be effected, for example, by extruding a melt of the wholly aromatic polyester composition through a slit or nozzle using an apparatus usually employed for the melt molding of an aromatic polyester such as polyethylene terephthalate.

The resulting unstretched film-like or fibrous article is then extracted with an organic solvent to remove at least a major portion of the low-molecular-weight compound contained in it. Extraction with organic solvents may be performed on the unstretched film-like or fibrous article, or after it is stretched, or after it is stretched and heat-set.

The extraction is carried out by using an organic solvent which can dissolve the low-molecular-weight compound but does not substantially dissolve the wholly aromatic polyester under the extracting conditions, preferably an organic solvent which in addition to meeting the above requirement, is liquid at ambient temperature and has a boiling point of less than about 200° C. under atmospheric pressure.

The organic solvent preferably include aromatic hydrocarbons having 6 to 9 carbon atoms, halogenated hydrocarbons having 1 or 2 carbon atoms, aliphatic ketones having 3 to 6 carbon atoms, aliphatic esters having 3 to 6 carbon atoms, 5- or 6-membered cyclic ethers, and aliphatic alcohols having 1 to 3 carbon atoms.

Specific examples of the organic solvent include aromatic hydrocarbons having 6 to 9 carbon atoms such as benzene, toluene, ethylbenzene, xylene, cumene and pseudocumene; halogenated aliphatic hydrocarbons having 1 or 2 carbon atoms such as methylene chloride, chloroform, and dichloroethane; aliphatic ketones having 3 to 6 carbon atoms such as acetone, methyl ethyl ketone and methyl isobutyl ketone; aliphatic esters having 3 to 6 carbon atoms such as methyl acetate, ethyl acetate, propyl acetate, methyl propionate, ethyl propionate and propyl propionate; 5- or 6-membered cyclic ethers such as tetrahydrofuran and dioxane; and aliphatic alcohols having 1 to 3 carbon atoms such as methanol, ethanol and propanol.

Of these, aromatic hydrocarbons habing 6 to 9 carbon atoms, halogenated hydrocarbons having 1 or 2 carbon atoms, and 5- or 6-membered cyclic ethers are especially preferred.

The extraction with the organic solvent is advantageously carried out on a unstretched or stretched film-like article having a thickness of not more than about 1 mm, preferably about 1 to about 500 microns or on a unstretched or stretched fibrous article having a diameter of not more than about 1 mm, preferably about 3 to about 400 microns.

Preferably, the extraction is carried out under tension, and can be carried out at a temperature between ambient temperature and the boiling point of the organic solvent used. The optimal extracting time required for the extraction varies depending upon the organic solvent used, the thickness of the film-like article to be submitted to the extraction, the diameter of the fibrous article to be submitted to the extraction, the amount of the low-molecular-weight compound contained in the film-like or fibrous article, the extracting temperature, etc. Generally, the optimal time required for the extraction becomes shorter as the thickness of the film-like article becomes smaller, the diameter of the fibrous article becomes smaller, and the extracting temperature becomes higher.

In many cases, the extraction can be terminated in several seconds to about 1 hour. Thus, there can be obtained a film-like or fibrous article from which at least about 90% by weight, preferably at least about 95% by weight, above all at least about 99% by weight, of the low-molecular-weight compound contained in it has been removed.

The extraction can be carried out by passing the running film-like or fibrous article through the organic solvent, or by dipping the stationary film-like or fibrous article in the organic solvent. In either case, the organic solvent may be flowing or stationary. Desirably, at least one of the film-like or fibrous article and the organic solvent is running or flowing. The amount of the organic solvent used for the extraction should of course be sufficient to dissolve all of the low-molecular-weight compound to be extracted. Usually, it is at least about 10 times, preferably at least about 15 times, the weight of the film-like or fibrous article.

The stretching before the extraction treatment is carried out by a known method monoaxially (the fibrous or film-like article), or biaxially (the film-like article) simultaneously or sequentially.

Let the heat distortion temperature of the wholly aromatic polyester composition be $T_g$ (°C.) and its melting point be $T_m$ (°C.), then the stretching temperature ($T_1$, °C.) for monoaxial stretching and simultaneous biaxial stretching is given by the following equation.

$$T_g - 10 \leq T_1 \leq T_m - 20,$$

preferably $$T_g - 5 \leq T_1 \leq T_m - 30$$

In the case of sequential biaxial stretching, the stretching temperature in the first stretching is the temperature $T_1$ given by the above equation, and the stretching temperature ($T_2$, °C.) in the second step is given by the following equation.

$$T_2 \geq T_1$$

The stretch ratio is usually about 2 to 10 in the case of the fibrous article, and about 2 to 30 in terms of area ratios in the case of the film-like article.

Since the wholly aromatic polyester composition used in the process of this invention contains the low-molecular-weight compound, its melt viscosity is lower than that of the wholly aromatic polyester itself contained in the composition. Hence, a very thin fibrous or film-like article can be produced even from the composition containing a wholly aromatic polyester having a high molecular weight.

Heat-setting before the extraction step is carried out under tension. The heat-setting temperature ($T_s$, °C.) for the article obtained by monoaxial stretching or simultaneous biaxial stretching is given by the following equation $$T_1 + 5 \leq T_s \leq T_m - 10$$

wherein $T_1$ is the stretching temperature (°C.) and $T_m$ is the melting point (°C.) of the wholly aromatic polyester composition.

In the case of the sequential biaxial stretching, the heat-setting temperature $T_s$ is given by the following equation $$T_2 + 5 \leq T_s \leq T_m - 10$$

wherein $T_2$ is the temperature (°C.) of the second stretching and $T_m$ is as defined.

The heat setting can be carried out usually for a period of 1 second to 10 minutes.

The unstretched or stretched film-like or fibrous article from which at least a major portion of the low-molecular-weight compound contained in it has been removed by extraction may then be stretched, or heat-set, or stretched and then heat-set, as required.

Stretching after the extracting step can be carried out at the same stretching temperature as described above with respect to stretching before extraction except that the heat-distortion temperature of the wholly aromatic polyester is substituted for the heat-distortion temperature of the wholly aromatic polyester composition in the equations given. The stretching ratio may be the same as that used before the extraction. Generally, the sum of the stretching ratio before extraction and that after extraction is within the above-given range of the stretch ratio before the extraction.

Heat-setting after the extraction step can be carried out under the same conditions as in the heat-setting before extraction except that the melting point of the wholly aromatic polyester is substituted for the molting point of the wholly aromatic polyester composition in the equations given.

Thus, according to the process of this invention, there can be produced a film-like or fibrous article of a wholly aromatic polyester which is substantially free from the low-molecular-weight compound or contains it in an amount of 1 part by weight at most per 100 parts by weight of the wholly aromatic polyester.

Since the film-like or fibrous article provided by this invention has excellent mechanical properties and heat resistance, the film-like structure can be used as metal-coated films obtained by vacuum deposition, flexible printed circuit films, films for magnetic tapes and electrical insulating films, and the fibrous article can be used, for example, as rubber reinforcing material.

The following examples illustrate the present invention in greater detail. It should be understood that the invention is in no way limited by these examples.

The various properties in these examples are measured or defined as follows:

Parts
  All parts are by weight unless otherwise specified.
Strength or tenacity, Young's modulus and elongation
  Measured at a tensile speed of 100%/min. using an Instron tester.
Reduced specific viscosity
  Determined at 35° C. for a solution in a mixed solvent of phenol and tetrachloroethane (60:40 by weight) in a polymer concentration of 1.2 g/dl.
Melt viscosity
  About one gram of the sample is filled in a cylinder having a cross sectional area of 1 cm$^2$ and equipped with an extruding nozzle with a diameter of 1 mm and a length of 5 mm, and the melt viscosity of the sample is measured by a flow tester.

Where the wholly aromatic polyester is optically isotropic in the molten state, the melting point ($T_m$ for the polymer and $T_m$, for the composition) is measured at a temperature elevating rate of 16° C./min. by using a differential thermal analyzer (DSC-1B, made by Parkin-Elmer Company). Where the wholly aromatic polyester is optically anisotropic in the molten state, the temperature at which the solid is transformed into an optically isotropic melt ($T_N$ for the polymer, and $T_{N'}$ for the composition) and the temperature at which the solid or optically anisotropic melt is transformed into an optically isotropic melt ($T_L$ for the polymer, and $T_{L'}$ for the composition) are measured by means of a micro melting point measuring instrument.

Heat distortion temperature of the wholly aromatic polyester composition or the wholly aromatic polyester ($T_g$, °C.)

An amorphous test film having a thickness of 500 microns, a width of 1 cm and a length of about 6 cm is prepared by melt shaping, and placed on a support stand having two fulcra apart from each other by a distance of 3 cm (each fulcrum having a width of 2 cm). A weight (10 g) is placed on the test film substantially midway between the two fulcra. The entire assembly is then submerged in a silicone oil bath. Then, the temperature of the silicone oil bath is raised at a rate of about 4° C./min. The temperature at which the central part of the test film having the weight placed thereon descends 1 cm from the upper end of the fulcra is measured, and defined as the heat distortion temperature.

Percent extraction (% by weight) of the low-molecular-weight compound

Calculated from the difference in the weight of the sample before and after extraction.

The following examples illustrate the present invention more specifically.

EXAMPLES 1 TO 7 AND COMPARATIVE EXAMPLE 1

(1) A polycondensation reactor equipped with a stirrer was charged with 1908 parts of diphenyl isophthalate, 554 parts of hydroquinone, 287 parts of 2,2-bis(p-hydroxyphenyl)propane and 0.7 part of antimony trioxide as a polycondensation catalyst. Under a nitrogen gas stream, the mixture was heated to 250° to 290° C. over the course of 120 minutes while distilling off the resulting phenol out of the reaction system. The temperature was further raised to 330° C., and the inside of the reaction system was gradually reduced, and in 60 minutes, the pressure of the reaction system was adjusted to not more than about 2 mmHg. The reaction mixture was further heated for 15 minutes under this pressure. The molten polymer obtained was cooled, pulverized to a size of 10 to 20 mesh, and then further polymerized in the solid phase at 290° C. and about 0.2 mmHg for 17 hours. The resulting polymer had a reduced specific viscosity of 0.98, a melting point of 355° C., and a melt viscosity at 360° C. of 12,000 poises.

(2) The polymer was dried, and 100 parts of the dried polymer was melt-mixed at 370° C. with a predetermined amount of each of the low-molecular-weight compounds shown in Table 1 by means of an extruder. The mixture was then cooled and formed into chips for molding. The melting points, and melt viscosities (at 330° C. and 360° C.) of the resulting molding compositions are shown in Table 1.

TABLE 1

| Example | Low-molecular-weight compound (parts) | Melting point (Tm') (°C.) | Melt viscosity (poises) 330° C. | 360° C. |
|---|---|---|---|---|
| 1 | 4,4'-bisphthalimido-diphenylsulfone (20) | 329 | 7,800 | 3,400 |
| 2 | 3,4'-bisphthalimido-diphenyl ether (20) | 327 | 7,500 | 3,300 |
| 3 | 4,4'-bis(1,8-naphthalimido)diphenyl ether (15) | 332 | 10,500 | 4,600 |
| 4 | 4,4'-bisphthalimido-diphenylmethane (30) | 330 | 4,800 | 2,300 |
| 5 | 4,4'-diphenoxydiphenyl-sulfone (35) | 320 | 4,500 | 2,000 |
| 6 | 4,4'-bis(4-phenylphenoxy)-diphenylsulfone (25) | 325 | 7,200 | 3,000 |
| 7 | 4,4'-bis(4-phenoxyphenoxy)-diphenylsulfone (30) | 325 | 7,300 | 3,100 |
| Comp. Ex. 1 | None | 355 | Infusible | 12,000 |

The starting polymer (Comparative Example 1) did not melt at 330° C., and showed a very high melt viscosity at 360° C. In contrast, the molding compositions in accordane with this invention had lower melting points and melt viscosities than those of the polymer itself, and thus showed excellent moldability.

EXAMPLE 8

The molding material obtained in Example 2 was dried, and then melt-extruded through a T-die having a slit with a width of 1 mm and a length of 100 mm using an extruder (with a cylinder temperature of 340° C.) to give an unstretched film having a thickness of about 0.4 mm. The unstretched films was then stretched to 2.0 times at 180° C. in the machine direction and then to 2.0 times at 180° C. in a direction at right angles to the machine direction. The stretched film was dipped at constant length in dioxane, treated for 30 minutes under refluxing of acetone, and then dried. This treatment resulted in extraction of 3,4'-bisphthalimidodiphenyl ether in an amount corresponding to 98% of that initially added.

The properties of the resulting film are shown in Table 2.

TABLE 2

| | Machine direction | Direction at right angles thereto |
|---|---|---|
| Strength (kg/mm²) | 13.8 | 13.1 |
| Elongation (%) | 61 | 62 |
| Heat shrinkage (%) | 0.5 | 0.4 |

The heat shrinkage of the film shown in Table 2 is that measured when the film was maintained under no tension at 250° C. for 2 minutes.

EXAMPLE 9

Diphenyl isophthalate (178 parts), 64.7 parts of hydroquinone and 30.0 parts of phenyl p-hydroxybenzoate were reacted in the presence of 0.09 part of antimony trioxide as a polycondensation catalyst in the same way as in Example 1, (1) to give a polymer having a melt viscosity at 360° C. of 17,000 poises, a melting point of 353° C. and a reduced specific viscosity of 1.03. One hundred parts of the resulting polymer was melt-mixed with 30 parts of 4,4'-bisphthalimidodiphenyl ether at 380° C. The mixture was then cooled and formed into chips. The resulting molding material had a melting point (Tm') of 322° C. and a melt viscosity of 3,800 poises at 360° C. and 8,800 poises at 330° C.

EXAMPLE 10

The molding material obtained in Example 9 was melt-extruded through a T-die having a slit with a width of 0.3 mm and a length of 100 mm using an extruder (with a cylinder temperature of 350° C.) to give an unstretched film having a thickness of about 0.2 mm. The film was then dipped in dioxane, treated for 30 minutes under refluxing of dioxane, and then dried. This treatment resulted in extraction of 4,4'-bisphthalimidodiphenyl ether in an amount corresponding to 96% of that added initially.

The properties of the resulting film are shown in Table 3.

TABLE 3

|  | Machine direction | Direction at right angles to the machine direction |
| --- | --- | --- |
| Strength (kg/mm$^2$) | 9.0 | 8.8 |
| Elongation (%) | 121 | 118 |
| Heat shrinkage (%) | 0.1 | 0.2 |

The heat shrinkage shown in Table 3 is that measured when the film was maintained at 280° C. for 2 minutes under no tension.

EXAMPLES 11 TO 16 AND COMPARATIVE EXAMPLE 2

A reactor equipped with a stirrer was charged with 318 parts of diphenyl isophthalate, 96.8 parts of hydroquinone, 50.2 parts of 2,2-bis(p-hydroxyphenyl)propane and 0.12 parts of antimony trioxide together with a predetermined amount of each of the low-molecular-weight compounds shown in Table 4. Under a nitrogen gas stream, the mixture was heated at 280° C. for 60 minutes, and then at 300° C. for 30 minutes while distilling off the resulting phenol out of the reaction system. The temperature was further raised to 330° C., and the inside pressure of the reaction system was gradually reduced, and in 30 minutes, adjusted to below about 0.5 mmHg (absolute). The reaction was carried out at this pressure for an additional 60 minutes.

Table 4 summarizes the melt viscosities (poises) of the resulting polymers which were determined from the stirring torque, the reduced specific viscosities of the polymers after they were treated in chip form in xylene for 1 hour under refluxing of xylene to extract the respective low-molecular-weight compounds, and the melting points of the polymers which were measured before and after the extraction treatment.

For comparison, the above polymerization was repeated except that no low-molecular-weight compound was used. The reaction product solidified during reaction under reduced pressure. When the solidified reaction product was pulverized to a size of 10 to 20 mesh and then reacted at 270° C. under a pressure of about 0.5 mmHg, a period of 24 hours was required until the reduced specific viscosity of the polymer reached 0.99.

TABLE 4

| Example | Low-molecular-weight compound (parts) | Melt viscosity (poises) | Reduced specific viscosity | Melting point (°C.) before extraction | Melting point (°C.) after extraction |
| --- | --- | --- | --- | --- | --- |
| 11 | N,N'—dodecamethylene-bisphthalimide (66) | 12,000 | 1.02 | 325 | 351 |
| 12 | N,N'—dodecamethylene-bis-1,8-naphthalimide (176) | 2,200 | 0.97 | 304 | 350 |
| 13 | N—stearyl 1,8-naphthalimide (47) | 25,000 | 1.07 | 328 | 352 |
| 14 | N,N'—dilaurylpyromellitimide (79) | 9,800 | 0.98 | 326 | 353 |
| 15 | 4,4'-diphenoxydiphenylsulfone (70) | 12,500 | 1.10 | 325 | 351 |
| 16 | 4,4'-bis(4-phenylphenoxy)diphenylsulfone (50) | 25,000 | 1.10 | 320 | 351 |
| Comp. Ex. 2 | None | — | 0.99 | 354 | — |

EXAMPLE 17

Diphenyl isophthalate (178 parts), 64.7 parts of hydroquinone, 39.9 parts of phenyl p-hydroxybenzoate, 0.09 part of antimony trioxide and 39.2 parts of N,N'-decamethylenebis-1,8-naphthalimide were reacted under the same conditions as in Example 8. The resulting polymer had a melt viscosity of 4,600 poises at 360° C. and 11,000 poises at 330° C., and a melting point of 327° C.

One hundred parts of the polymer was dipped in 500 parts of xylene for 1 hour under reflux. As a result, 19 parts of the N,N'-decamethylenebis-1,8-naphthalimide was extracted with the polymer. After the extraction, the polymer had a reduced viscosity of 1.04 and a melting point of 352° C.

EXAMPLES 18 TO 24

The polymer having a reduced specific viscosity of 0.98 produced in Example 1, (1) was dried, and 100 parts of the dried polymer was melt-mixed with a predetermined amount of each of the imide compounds shown in Table 5 at about 370° C. by means of an extruder. The mixture was then cooled and formed into chips to provide molding materials. The melting points and melt viscosities at 330° C. and 360° C. of the resulting molding materials are shown in Table 5. Table 5 also shows the results of Comparative Example 1.

TABLE 5

| Example | Imide compound Type | Amount (parts) | Melting point (°C.) | Melt viscosity (poises) at 330° C. | Melt viscosity (poises) at 360° C. |
| --- | --- | --- | --- | --- | --- |
| 18 | N,N'—dodecamethylenebisphthalimide | 15 | 331 | 10,000 | 4,500 |
| 19 | N,N'—dodecamethylenebisphthalimide | 30 | 322 | 4,700 | 2,100 |
| 20 | N,N'-octamethylenebisphthalimide | 20 | 327 | 7,400 | 3,300 |
| 21 | N,N'-dodecamethylenebis-1,8-naphthalimide | 20 | 328 | 7,200 | 3,200 |
| 22 | N—stearyl-1,8-naphthalimide | 15 | 329 | 10,100 | 4,600 |
| 23 | N,N'—bis(3,3.5-trimethylcyclohexyl)-pyromellitimide | 20 | 330 | 7,100 | 3,100 |

TABLE 5-continued

| Example | Imide compound Type | A-mount (parts) | Melting point (°C.) | Melt viscosity (poises) at 330° C. | 360° C. |
|---|---|---|---|---|---|
| 24 | 1-phthalimide-3-phthalimidomethyl-3,5,5-trimethyl-cyclohexane | 20 | 326 | 6,900 | 3,000 |
| Comparative Example 1 | None | — | 355 | infusible | 12,000 |

It is seen from the above results that the polymer used as a raw material (Comparative Example 1) did not melt at 330° C. and showed a very high melt viscosity at 360° C., whereas the molding compositions in accordance with this invention had lower melting points and melt viscosities than the polymer itself and showed excellent moldability.

EXAMPLE 25

The molding composition obtained in Example 19 was dried, and then melt-extruded through a T-die having a slit with a width of 1 mm and a length of 100 mm using an extruder (with a cylinder temperature of 340° C.) to produce an unstretched film having a thickness of about 0.6 mm. The unstretched film was then stretched to 2.0 times in the machine direction at 150° C., and then to 2.0 times in a direction at right angles to the machine direction at the same temperature. The stretched film was then heat-treated at constant length at 280° C. for 30 seconds. The film was dipped in xylene, treated for 15 minutes under refluxing of xylene, and then dried. As a result of this treatment, N,N'-dodecamethylenebisphthalimide was extracted in an amount corresponding to 97% of the amount initially used.

The resulting film had the properties shown in Table 6.

TABLE 6

| | Machine direction | Direction at right angles to the machine direction |
|---|---|---|
| Strength (kg/mm²) | 14.2 | 13.7 |
| Elongation (%) | 55 | 61 |
| Heat shrinkage (%) | 0.6 | 0.5 |

The heat shrinkage shown in Table 6 is that measured when the film was maintained at 250° C. for 2 minutes under no tension.

EXAMPLE 26

One hundred parts of the polymer having a reduced specific viscosity of 1.03 obtained in Example 9 was melt-mixed with 30 parts of N,N'-decamethylenebis-1,8-naphthalimide at 380° C. The mixture was cooled and formed into chips. The resulting molding composition had a melting point of 328° C. and a melt viscosity of 3,600 poises at 360° C. and 8,300 poises at 330° C.

EXAMPLE 27

The molding composition obtained in Example 26 was melt-extruded through a T-die having a slit with a width of 0.3 mm and a length of 100 mm using an extruder (with a cylinder temperature of 350° C.) to form an unstretched film having a thickness of about 0.2 mm. The unstretched film is then dipped in toluene, treated for 15 minutes under refluxing of toluene, and then dried. As a result of this treatment, 98%, based on the initially added amount, of N,N'-decamethylenebis-1,8-naphthalimide was extracted from the polymer.

The resulting film had the properties shown in Table 7.

TABLE 7

| | Machine direction | Direction at right angles to the machine direction |
|---|---|---|
| Strength (kg/mm²) | 9.1 | 9.0 |
| Elongation (%) | 117 | 113 |
| Heat shrinkage (%) | 0.1 | 0.3 |

The heat shrinkage shown in Table 7 is that measured when the film was maintained at 280° C. for 2 minutes under no tension.

EXAMPLES 28 TO 33 AND COMPARATIVE EXAMPLE 3

A three-necked reactor equipped with a stirrer was charged with 214 parts of phenyl p-hydroxybenzoate, 318 parts of diphenyl isophthalate, 115.5 parts of hydroquinone, 0.35 part of antimony trioxide and a predetermined amount of each of the imide compounds shown in Table 8. These materials were reacted at 240° to 280° C. under atmospheric pressure for 90 minutes. Then, the pressure of the inside of the reactor was gradually reduced, and the temperature was gradually raised. In 30 minutes, the pressure was about 0.1 mmHg (absolute) and the temperature was 330° C. Under these conditions, the reaction was carried out for the periods (reduced pressure reaction time) indicated in Table 8. The resulting polymer composition was pulverized to form chips.

The transition temperatures ($T_{N'}$, $T_{L'}$) of the resulting composition in chips, and the reduced specific viscosity ($\eta_{sp/c}$) and transition temperatures ($T_N$, $T_L$) of the polymer obtained by extracting the above composition with dioxane under reflux are shown in Table 8.

It is seen from Table 8 that the polymer left after extraction of the imide compound showed melting anisotropy at more than about 300° C. and did not change even at 370° C. ($T_L > 370°$ C.), whereas the compositions of this invention became optically isotropic melts at temperatures higher than $T_L$, shown in Table 8.

For comparison, polycondensation was carried out under the same conditions as above except that no imide compound was added. During the reaction under reduced pressure, the melt viscosity of the reaction product abruptly increased to make the stirring of the reaction mixture impossible.

TABLE 8

| Example | Imide compound Type | Amount (parts) | Reduced pressure reaction time (minutes) | Transition temperatures of the composition (°C.) $T_{N'}$ | $T_{L'}$ | $[\eta_{sp/c}]$ of the polymer | Transition temperature of the polymer (°C.) $T_N$ | $T_L$ |
|---|---|---|---|---|---|---|---|---|
| 28 | 4,4'-bisphthalimido-diphenyl ether | 154 | 120 | 267 | 280 | 2.14 | 302 | >370 |
| 29 | 4,4'-bisphthalimido-diphenyl ether | 360 | 180 | 266 | 270 | 2.16 | 303 | >370 |
| 30 | 3,4'-bisphthalimido-diphenyl ether | 154 | 60 | 256 | 287 | 1.97 | 303 | >370 |
| 31 | 4,4'-bisphthalimdo-diphenyl sulfone | 240 | 150 | 283 | 313 | 2.06 | 301 | >370 |
| 32 | 3,3'-bisphthalimido-diphenyl sulfone | 360 | 150 | 282 | 313 | 2.10 | 302 | >370 |
| 33 | 3,4'-bis(1,8-naphthalimido)diphenyl ether | 240 | 60 | 267 | 327 | 1.69 | 296 | >370 |

EXAMPLES 34 TO 36 AND COMPARATIVE EXAMPLE 4

Example 28 was repeated except that 256.8 parts of phenyl p-hydroxybenzoate, 254.4 parts of diphenyl isophthalate, 92.4 parts of hydroquinone and 336 parts of each of the imide compounds shown in Table 9 were used instead of the materials in Example 28, and the reaction time at about 0.1 mmHg (absolute) was changed as shown in Table 9. The properties of the resulting compositions as shown in Table 9.

TABLE 9

| Example | Imide compound | Reduced pressure reaction time (min.) | Transition temperatures of the composition (°C.) $T_{N'}$ | $T_{L'}$ | $[\eta_{sp/c}]$ of the polymer | Transition temperatures of the polymer (°C.) $T_N$ | $T_L$ |
|---|---|---|---|---|---|---|---|
| 34 | 4,4'-bisphthalimido-diphenyl ether | 50 | 254 | 325 | 1.87 | 285 | >370 |
| 35 | 3,4'-bisphthalimido-diphenyl ether | 40 | 220 | 300 | 1.23 | 284 | >370 |
| 36 | 4,4'-bisphthalimido-diphenyl sulfone | 180 | 302 | 340 | (*) | 320 | >370 |

(*): The polymer was insoluble in the solvent used for the measurement of its viscosity.

For comparison, the above reaction was repeated except that no imide compound was added. The reaction product solidified during reaction under reduced pressure.

The compositions obtained in Examples 34, 35 and 36 had a melt viscosity (measured at a temperature of 380° C. and a shear rate of 100 sec$^{-1}$) of 8,700 poises, 1,200 poises, and 22,000 poises, respectively, and after extraction with dioxane, showed a melt viscosity (measured at a temperature of 380° C. and a shear rate of 100 sec$^{-1}$) of 36,000 poises, 8,400 poises, and 52,000 poises, respectively. The extracting treatment with dioxane was carried out by refluxing 10 parts of each of the compositions pulverized to a size of 10 to 20 mesh in a Soxhlet extractor for 2 hours using 300 parts of dioxane.

EXAMPLES 37 AND 38

The composition obtained in Example 28 was dried, and extruded at a cylinder temperature of 370° C. through a T-die having a slit with a width of 0.3 mm and a length of 10 cm. The resulting film had a heat distortion temperature of 127° C. The film was then stretched simultaneously to 1.1 times in the machine direction at 200° C. and to 5.2 times in the transverse direction at the same temperature, dipped at constant length in chloroform under reflux for 15 minutes to extract the imide compound, and dried.

By nitrogen analysis, the resulting film was found to contain 0.2% by weight of 4,4'-bisphthalimidodiphenyl ether. The properties of the film obtained are shown in Table 10 (Example 37).

Then, the film was heat-treated for 10 seconds in a silicone oil bath at 240° C. while maintaining it under 10% stretch in the longitudinal direction and at constant length in the transverse direction. The properties of the resulting film are shown in Table 10 (Example 38).

TABLE 10

| Example | Strength (kg/mm$^2$) TD | MD | Young's modulus (kg/mm$^2$) TD | MD | Elongation (%) TD | MD |
|---|---|---|---|---|---|---|
| 37 | 41.6 | 13.5 | 910 | 257 | 10 | 26 |
| 38 | 43.9 | 12.1 | 1305 | 251 | 5 | 14 |

TD: transverse direction;
MD: machine direction.

EXAMPLES 39 AND 40

The composition (chips) obtained in Example 29 was polymerized in the solid phase at 250° C. and about 0.1 mmHg (absolute) for 1 hour, at 260° C. for 2 hours and further at 265° C. for 5 hours. The resulting composition had a transition temperature of 294° C. ($T_{N'}$) and 306 ($T_{L'}$). After extracting the resulting composition with dioxane, the polymer was insoluble in the solvent used for measuring $[\eta_{sp/c}]$. The composition obtained by solid-phase polymerization was again melted at 360° C. and quenched, and then extracted with dioxane. The resulting polymer was soluble in the solvent for measuring $[\eta_{sp/c}]$ and had an $[\eta_{sp/c}]$ of 3.96.

An unstretched film was prepared from the resulting composition in the same way as in Example 37. The film was dipped in dioxane under reflux for 30 minutes at constant length to extract the imide compound. The amount of 4,4'-bisphthalimide diphenyl ether remaining in the film after extraction was 0.4% by weight.

The film was then stretched to 2 times in the machine direction at 190° C. and then to 2.5 times in the transverse direction at 220° C. to give a film having the properties shown in Table 11 (Example 39). The film was heat-treated under tension at about 0.1 mmHg (absolute) for 30 minutes while gradually raising the temperature from 240° C. to 280° C. The resulting film (Example 40) had the properties shown in Table 11.

TABLE 11

| Example | Strength (kg/mm$^2$) TD | Strength (kg/mm$^2$) MD | Young's modulus (kg/mm$^2$) TD | Young's modulus (kg/mm$^2$) MD | Elongation (%) TD | Elongation (%) MD |
|---|---|---|---|---|---|---|
| 39 | 34.4 | 26.8 | 703 | 670 | 10 | 8 |
| 40 | 41.2 | 31.3 | 859 | 716 | 5 | 4 |

TD: transverse direction;
MD: machine direction.

EXAMPLE 41

The unstretched film obtained in Example 31 was stretched simultaneously in the machine and transverse directions at 130° C. to 2.0 and 3.0 times, then dipped in chloroform under reflux for 15 minutes under tension, and then dried.

The resulting film was heat-treated for 10 seconds in a silicone oil bath at 220° C. while maintaining it under 20% stretch both in the machine and transverse directions. The resulting film had the properties shown in Table 12.

TABLE 12

| Properties | MD | TD |
|---|---|---|
| Strength (kg/mm$^2$) | 24.5 | 28.8 |
| Young's modulus (kg/mm$^2$) | 505 | 680 |
| Elongation (%) | 21 | 11 |

EXAMPLES 42 AND 43

An unstretched film was prepared in the same way as in Example 37 using the composition obtained in Example 31. The film had a heat distortion temperature of 135° C. The film was stretched to 3.5 times in the transverse direction at 170° C., dipped for 15 minutes in dioxane under reflux at constant length, dried, and then stretched to 2 times in the machine direction at 200° C. The amount of 4,4'-bisphthalimide diphenyl sulfone remaining in the film was 0.3% by weight.

The properties of the film (Example 42) and the properties of a film (Example 43) obtained by heat-treating the aforesaid film while it was stretched to 1.2 times in the transverse direction at 240° C. are shown in Table 13.

TABLE 13

| Example | Strength (kg/mm$^2$) TD | Strength (kg/mm$^2$) MD | Young's modulus (kg/mm$^2$) TD | Young's modulus (kg/mm$^2$) MD | Elongation (%) TD | Elongation (%) MD |
|---|---|---|---|---|---|---|
| 42 | 30.6 | 19.3 | 850 | 375 | 17 | 14 |
| 43 | 42.3 | 17.2 | 1120 | 293 | 6 | 19 |

EXAMPLES 44 AND 45

The composition (chips) obtained in Example 34 was polymerized in the solid phase at 240° C. and about 0.1 mmHg (absolute) for 15 hours. The resulting composition had a transition temperature of 295° C. ($T_N$) and 343° C. ($T_L$).

The resulting composition was dried, and extruded at a cylinder temperature of 370° C. through a T-die having a slit with a width of 1 mm and a length of 15 cm, dipped for 30 minutes in dioxane under reflux at constant length, and dried. After the extraction, the amount of 4,4'-bisphthalimide diphenyl ether remaining in the film was 0.7% by weight. The film obtained (Example 44) was transparent, and had the properties shown in Table 14.

The film after extraction was stretched biaxially to 2.0 times in the machine direction at 230° C., and then to 3.0 times in the transverse direction at 250° C. The resulting film (Example 45) had the properties shown in Table 14.

TABLE 14

| Example | Strength (kg/mm$^2$) MD | Strength (kg/mm$^2$) TD | Young's modulus (kg/mm$^2$) MD | Young's modulus (kg/mm$^2$) TD | Elongation (%) MD | Elongation (%) TD |
|---|---|---|---|---|---|---|
| 44 | 16.6 | 11.2 | 359 | 250 | 54 | 35 |
| 45 | 25.0 | 28.1 | 619 | 875 | 9 | 5 |

MD: machine direction;
TD: transverse direction.

EXAMPLES 46 AND 47

The molding composition obtained in Example 32 was dried, melt-extruded at 350° C. through a spinneret having an orifice diameter of 1 mm to form unstretched filaments which had a heat distortion temperature of 115° C.

The unstretched filaments were stretched to 3.2 times on a hot plate at 180° C., dipped for 15 minutes in dioxane under reflux at constant length, and dried (Example 46).

Alternatively, the stretched filaments were heat-treated under tension by raising the temperature from 250° C. to 290° C. at about 0.1 mmHg (absolute) over the course of 1 hour (Example 47).

The properties of the treated filaments are shown in Table 15.

TABLE 15

| Example | Strength (g/de) | Young's modulus (g/de) | Elongation (%) |
|---|---|---|---|
| 46 | 4.7 | 125 | 5 |
| 47 | 13.5 | 229 | 8 |

EXAMPLE 48

The same reaction was in Example 28 was carried out except that 254.4 parts of diphenyl terephthalate, 63.6 parts of diphenyl isophthalate, 189 parts of t-amylhydroquinone and 0.08 part of antimony trioxide were used, and the reaction time was changed to 30 minutes. A polymer was obtained which had an [$\eta_{sp/c}$] of 2.87 and a transition temperature of 272° C. ($T_N$) and higher than 370° C. ($T_L$).

One hundred parts of the polymer was dry-blended with 40 parts of 4,4'-bisphthalimidodiphenyl ether. The mixture was extruded at 330° C. through a twin-screw extruder to form chips. The resulting composition (chips) had a transition temperature of 203° C. ($T_{N'}$) and 316° C. ($T_{L'}$). The composition was melt-extruded at 330° C. through a spinneret having an orifice diameter of 0.5 mm to form unstretched filaments. The unstretched filaments were stretched at 160° C. to 3.0 times, then dipped for 15 minutes in chloroform under reflux at constant length, and dried. The resulting filaments had a tenacity of 4.0 g/de, and a Young's modulus of 278 g/de.

EXAMPLE 49

Diphenyl terephthalate (270 parts), 48 parts of diphenyl isophthalate, 198 parts of tert.-amylhydroquinone, 0.12 part of antimony trioxide and 40 parts of 4,4'-bis(4-tert.-octylphenoxy)diphenylsulfone were reacted under the same conditions as in Example 1. The resulting polymer had a melt viscosity of 5,000 poises at 360° C. and 15,000 poises at 330° C., and a melting point of 250° C.

When 100 parts of the polymer was dipped in 500 parts of xylene under reflux for 1 hour, 11 parts of the 4,4'-bis(4-tert.-octylphenoxy)diphenylsulfone could be extracted. After extraction, the polymer had a reduced viscosity of 4.50 and a melting point of 305° C.

What we claim is:

1. A process for producing a film-like or fibrous article of a wholly aromatic polyester, which comprises
   (1) melt-molding a wholly aromatic polyester composition comprising
   (a) 100 parts by weight of a wholly aromatic polyester containing as a main component at least one compound selected from the group consisting of aromatic dicarboxylic acids, aromatic dihydroxy compounds and aromatic hydroxycarboxylic acids, and
   (b) from 5 to 300 parts by weight of a low-molecular-weight compound being substantially non-reactive with the wholly aromatic polyester and having a boiling point of at least about 200° C. under atmospheric pressure and a molecular weight of not more than 1,000, selected from the group consisting of imide compounds, isocyanurate compounds and diphenyl or the formula

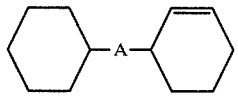

wherein A represents —O—, —$SO_2$—, —CO— or are alkylene group, an the phenyl groups may be substitutes,
into an unstretched film-like or fibrous article, and
   (2) removing at least a major portion of the low-molecular-weight compound from the unstretched film-like or fibrous article by extraction with an organic solvent capable of dissolving the low-molecular-weight compound but substantially incapable of dissolving the wholly aromatic polyester under the extracting conditions; or stretching the unstretched film-like or fibrous article, and after, as desired, the stretched article is heat-set, removing at least a major portion of the low-molecular-weight compound from the stretched article by extraction with an organic solvent having the same properties as above.

2. The process of claim 1 wherein after steps (1) and (2) are carried out, the product is further stretched, or heat-set, or stretched and then heat-set.

3. The process of claim 1 wherein the organic extracting solvent is liquid at ambient temperature and has a boiling point lower than about 200° C. under atmospheric pressure.

4. The process of claim 1 or 3 wherein the organic solvent is an aromatic hydrocarbon having 6 to 9 carbon atoms, a halogenated hydrocarbon having 1 or 2 carbon atoms, an aliphatic ketone or ether having 3 to 6 carbon atoms, a 5- or 6-membered cyclic ether, or an aliphatic alcohol having 1 to 3 carbon atoms.

5. The process of claim 1 wherein the extraction is carried out at a temperature between ambient temperature and the boiling point of the organic solvent.

6. The process of claim 1 wherein the extraction is carried out under tension.

7. The process of claim 1 wherein the wholly aromatic polyester is one which will form an optically anisotropic melt, and the wholly aromatic polyester composition is melt-molded from its optically isotropic melt.

8. The process of claim 1 wherein the film-like article to be subjected to the extraction has a thickness of not more than 1 mm.

9. The process of claim 1 or 8 wherein the film-like article to be subjected to the extraction has a thickness of about $1\mu$ to about $500\mu$.

10. The process of claim 1 wherein the fibrous article to be subjected to the extraction has an average diameter of not more than about 1 mm.

11. The process of claim 1 or 10 wherein the fibrous article to be subjected to the extraction has an average diameter of about $3\mu$ to about $400\mu$.

* * * * *

UNITED STATES PATENT AND TRADEMARK OFFICE
CERTIFICATE OF CORRECTION

PATENT NO. : 4,416,839
DATED : November 22, 1983
INVENTOR(S) : INATA, ET AL.

It is certified that error appears in the above—identified patent and that said Letters Patent is hereby corrected as shown below:

Claim 1, line 18, after "diphenyl", insert --compounds of-- and delete "or";

delete the formula on line 19 and insert therefor

--  -- ;

line 20, delete "A", insert --$A^3$--;
line 21, delete "are", insert --an--, delete "an", insert --and--;
line 22, delete "substitutes", insert --substituted--.

Signed and Sealed this

Twenty-second Day of May 1984

[SEAL]

Attest:

GERALD J. MOSSINGHOFF

*Attesting Officer*     *Commissioner of Patents and Trademarks*